United States Patent Office 3,181,959
Patented May 4, 1965

3,181,959
REFRACTORY
Frank F. Raine and Roy Thomas Smith, Mexico, Mo., assignors to Kaiser Aluminum & Chemical Corporation, Oakland, Calif., a corporation of Delaware
No Drawing. Filed Feb. 12, 1962, Ser. No. 172,762
10 Claims. (Cl. 106—64)

This invention relates to refractory materials for use in the placement or patching of linings in furnaces; and in particular it relates to a refractory admixture suitable for placement by a gunning device.

In the placement of refractories on furnace walls, particularly in the patching of such walls, it has been a well known practice to apply these materials by means of a gun device, and to spray them onto the walls in admixture with water. The problems which arise in such placement of refractory material comprise especially the "rebound" and also excessive shrinkage or pulling away from the base wall upon either drying or firing of the mix which has been so applied. In the rebound problem, excessive amounts of the refractory material drop back off the walls and do not adhere thereto, due to the considerable force with which they are applied by the spray gun. This results is loss of refractory materials, loss of time and excessive costs in repair. On the other hand, when the materials do adhere to the walls, it has frequently been found that upon drying, and particularly on firing or when the material is applied to a hot furnace wall, the shrinkage is excessive and the material will either crack or pull away from the wall or both.

According to the present invention there is provided an improved refractory composition which is applied to furnace walls with the usual gunning device without appreciable rebound and which adheres well to the wall, and dries and fires in place without the development of any substantial amount of shrinkage cracks and without pulling away from the wall, particularly when applied to a hot furnace wall.

The refractory composition of the present invention includes at least one refractory aggregate in coarse grain sizes chosen from the group consisting of nonplastic calcined clay, bauxite, mullite and alumina, such coarse grains being of particle sizes preferably substantially entirely passing through a 3 mesh screen, a plasticizing and bonding amount of a plastic clay, preferably of particle sizes passing through an 18 mesh screen, a small amount of pulverized grog, such as burned clay firebrick, raw or calcined cyanite, mullite, bauxite, or alumina, and at least one refractory cementitious material chosen from the group consisting of Portland cement and calcium aluminate. The composition should consist essentially of from 60% to 80% of the refractory aggregate described herein of particle size passing through a 3 mesh screen, from 15% to 30% of the plastic bonding clay, from 2.5% to 7.5% of pulverized grog, and from 2.5% to 7.5% of the cementitious material herein described. In one advantageous embodiment of the invention, the composition consists essentially of from 60% to 80% of nonplastic calcined clay passing 3 mesh, from 15% to 30% of plastic bonding clay, from 2.5% to 7.5% of pulverized grog and from 2.5% to 7.5% of Portland cement, especially of high early strength Portland cement such as that having a specific surface of about 5,000 sq. centimeters per gram. The composition will be described with particular reference to the nonplastic calcined clay mixes but it will be understood that to obtain a more refractory product there should be incorporated higher alumina materials of the type of bauxite, alumina grains, and mullite, instead of part or all of the calcined flint clay aggregate, preferably with a cementitious material consisting in part or entirely of calcium aluminate cement.

The coarse refractory grains, that is passing 3 mesh, which are used in the present composition are suitably any nonplastic calcined refractory clay, but it is preferred to use calcined flint clay of the particle sizes indicated. However, alternatively there can be used in the coarse fraction, other calcined nonplastic clay, which has been hardburned and exhibits negligible shrinkage upon reheating or re-firing.

The plasticizing and bonding clay which is employed is any suitable plastic clay and it is employed in particle sizes passing 18 mesh. For best results in the present composition, there is used such clay which passes through an 18 mesh rectangular screen. One clay which has been found to give very good results in this composition is known as Havener stained clay which is mined near Mexico, Missouri, and has a typical screen analysis, in the dry state, of 4% passing 14 mesh and retained on 20 mesh, 15% passing 20 and retained on 28 mesh, 19% passing 28 and retained on 35 mesh, 15% passing 35 and retained on 48 mesh, 11% passing 48 and retained on 65 mesh, 15% passing 65 and retained on 100 mesh and 24% passing 100 mesh. It has a typical chemical analysis of from 50.82 to 51.70% silica, 31.33–32.18% alumina, 1.39–1.79% $Fe_2O_3$, 1.34–3.04% $TiO_2$, 0.24–0.25% CaO, 0.22–0.25% MgO, 0.79–1.06% alkalies, and 12% ignition loss. It will be understood, however, that other plastic bonding clays having other particle size distribution can be employed.

The pulverized grog which is employed is any finely divided dead burned aluminous aggregate, such as mullite, raw or calcined cyanite, calcined bauxite, alumina or burned clay brick. The grog is preferably used in particle sizes passing 35 mesh and excellent results have been obtained by incorporating a pulverized product obtained by grinding burned fire clay brick to substantially all passing through a 35 mesh screen with about 45 to 50% passing through a 300 mesh screen. Preferably the grog is used in an amount of about 5% of the total mix.

There is used as a further binding ingredient and to get a fast early set, a Portland cement, calcium aluminate or mixtures of these two cements with each other. It has been found that the incorporation of the cement described and in the amounts shown herein acts to prevent shrinkage in the composition when applied to a furnace wall. Where Portland cement is employed it is preferred to use a Type 3 cement or what is known as high early strength Portland cement. As is well known in the art, such high early strength cement is characterized by extremely finely divided particle size, having a specific surface of over 3200 sq. cm. per gram. Preferably such a cement exhibits a specific surface, according to the Blaine method, of about 5000 sq. centimeters per gram. It is characterized by containing a predominant amount of tricalcium silicate, with a small amount of calcium aluminate cement. Such a cement will set upon mixing with water and will develop within 24 to 36 hours substantially the same strength as other Portland cements develop at the end of 7 days holding period. A typical chemical analysis of such a high early strength Portland cement is as follows: 21.3% silica, 2.67% alumina, 5.08% $Fe_2O_3$, 65.89% CaO, 1.90% MgO, 2.28%, $SO_3$, 0.35% alkalies and 0.7% ignition loss.

In using the refractory composition according to the present invention, a batch of the composition defined above is fed to gunning device, and it is mixed with 7.5% to 9.0%, preferably from about 7.7% to about 8.6% water, and is applied to a furnace wall. There can be employed any spray gun of a type well known in this art, for example, a Jet-Crete gun (which is made by Engineered Equipment, Inc., of Waterloo, Iowa), or a Ridley gun, made by Ridley and Co. The admixture can be gunned onto either cold or hot surfaces; and when gunned onto a refractory wall which is maintained at a temperature of about 1900° F. (1038° C.), for example, has been found to exhibit excellent bonding results. Gunning at temperatures higher than 1900° F. is also satisfactory.

It is an advantage of the present invention that the refractory composition which is provided guns onto a wall and sets very rapidly thereon, adhering well with a minimum of rebound, and burning to a strong monolithic structure, exhibiting few if any cracks and free of pulling away from the wall after cooling down again.

*Example 1*

As an example of a composition according to the present invention, there is prepared an admixture of 70 parts of dry calcined flint clay, of particle sizes 3 mesh by down, i.e., passing through a 3 mesh screen, 20 parts of Havener clay as described above, passing through an 18 mesh rectangular screen, 5 parts of pulverized fire clay burned brick passing through a 35 mesh screen and 40% thereof passing 300 mesh, and 5 parts of high early strength Portland cement having a particle size of 5000 sq. centimeters per gram by the Blaine method. An amount of this composition is charged to a gun and is mixed either partially or completely at the nozzle with about 7.7% of water to form a mix suitable for spray application to a refractory wall. The admixture is then gunned onto a furnace wall having a temperature of about 1900° F. and made up of fire clay brick. The admixture adheres to the wall with not over about 10–15% rebound or lost material, and after cooling down the gunned patch is found to remain tightly adhered to the wall with very few cracks.

*Example 2*

In another series of tests with the same material as in Example 1, the water mixture is applied with a commercial gun device to the following sites in a steel mill: (1) cold soaking pit walls, (2) hot soaking pit curbs or copings where the pit has been operating at about 2300° F. just prior to removal of the cover and with gunning immediately after such removal, (3) as patching in a 29 inch billet re-heat furnace, and (4) cold seal coating of the walls of an open hearth checker chamber. The mix is gunned at high speed, i.e. in third gear of a four-gear gun, and all the above gunning is done with smooth uninterrupted flow from the gun, and without jamming or clogging of the gun.

The rebound is low and there is substantially no dusting, with production of a very dense surface. The mass bonds well to all of the walls, which are of clay or silica refractory in each instance, and there is no pulling away of the gunned mass, and substantially no cracks, any which do occur being quite small. The applied product is found to wear or last from 30% to 50%, or more, longer than other commercially available gunning mixes. The mix is found to perform excellently when applied either to cold or to hot surfaces.

For more refractory products another nonplastic, aluminous coarse grain material such as alumina, calcined bauxite or a burned alumina silicate, such as mullite, can be employed in admixture with or instead of the calcined flint. Also in such products calcium aluminate cement, especially when of high purity, i.e. especially when low in iron content, can be employed in admixture with or substituted for the Portland cement, particularly high early strength or Type 3 Portland cement shown above and in the amounts shown above. The substitution of alumina, especially hard burned, high purity alumina for part or all of the calcined flint, produces highly refractory gunning compositions. Another finely ground nonplastic refractory material, such as mullite, raw or calcined kyanite, bauxite, alumina can be employed with or for the pulverized grog to further produce more highly refractory gunning compositions. The calcium aluminate cement employed should be a plastic composition and one such cement which has been found to give very good results contains about 79% $Al_2O_3$ and about 18% CaO, which corresponds to a molecular ratio of about $$2CaO \cdot 5Al_2O_3$$

As an example of such a higher refractory product according to the present invention there is prepared an admixture of 15% to 50% calcined flint clay passing 3 mesh, 20% Havener stained clay as described above passing 18 mesh, from 55% to 20% calcined British Guiana bauxite passing 6 mesh, 5% pulverized grog, preferably bauxite, and 2.5% to 5% high purity calcium aluminate cement of molecular ratio $2CaO \cdot 5Al_2O_3$, and 0% to 2.5% high early strength Portland cement as described above, to provide a total amount of 5% cement. This mixture is suitable for application by a gun in the manner described in Example 1 and with admixture of about 7.7% to 8.4% water, to the rosette ring, i.e., at the burner opening, in a soaking pit or in other sites where higher refractoriness or greater resistance to attack by slags such as iron slags is desired.

Particle sizes where shown are Tyler screen mesh sizes; and percentages and parts shown herein are by weight unless otherwise indicated. Where bauxite is employed, it is high purity calcined or hard burned ore, for example, such as is produced in British Guiana, and exhibits very little or no shrinkage upon further firing.

Having now described the invention, what is claimed is:

1. A refractory composition consisting essentially of from 60% to 80% of nonplastic calcined refractory clay of particle sizes substantially entirely passing 3 mesh, from 15% to 30% of plastic clay of particle sizes passing 18 mesh, from 2.5% to 7.5% pulverized grog, and from 2.5% to 7.5% Portland cement.

2. A refractory composition consisting essentially of from 60% to 80% of nonplastic calcined refractory clay of particle sizes substantially entirely passing 3 mesh, from 15% to 30% of plastic clay of particle sizes passing 18 mesh, from 2.5% to 7.5% pulverized grog, and from 2.5% to 7.5% high early strength Portland cement.

3. A refractory composition consisting essentially of from 60% to 80% of nonplastic calcined refractory clay of particle sizes substantially entirely passing 3 mesh, from 15% to 30% of plastic clay of particle sizes passing 18 mesh, from 2.5% to 7.5% pulverized grog, and from 2.5% to 7.5% Portland cement, said cement having a specific surface of about 5000 sq. centimeters per gram.

4. A refractory composition consisting essentially of 70% calcined flint clay of particle sizes substantially entirely passing 3 mesh, 20% bonding plastic clay of particle sizes substantially entirely passing through an 18 mesh rectangular screen, 5% pulverized burned clay grog passing 34 mesh, and 5% Portland cement having a specific surface of about 5000 sq. centimeters per gram.

5. Method of patching an interior wall of a furnace which comprises preparing a refractory batch consisting essentially of from 60% to 80% nonplastic, calcined refractory clay of particle sizes substantially entirely passing 3 mesh, from 15% to 30% plastic bonding clay passing 35 mesh, from 2.5% to 7.5% pulverized grog and from 2.5% to 7.5% Portland cement, admixing with said batch a tempering amount of water, and blowing a stream of said admixtures onto said interior wall, said wall being maintained at a temperature of about 1900° F.

6. A plastic refractory gunning composition consisting essentially of from 60% to 80% of at least one coarse, hard refractory aggregate chosen from the group consisting of mullite, hard burned alumina, hard burned bauxite and calcined flint, said coarse aggregate being of particle sizing passing a 3 mesh screen, 15% to 30% of plastic clay passing 18 mesh, from 2.5% to 7.5% pulverized grog, and from 2.5% to 7.5% of at least one refractory cement chosen from the group consisting of Portland cement and calcium aluminate cement.

7. A plastic refractory gunning composition as in claim 6 wherein said cement is high early strength Portland cement.

8. A plastic refractory gunning composition as in claim 6 wherein said cement consists of 2.5% Portland cement having a specific surface of 5000 sq. centimeters per gram and 2.5% of said Ca aluminate cement.

9. A plastic refractory gunning composition consisting essentially of from 60% to 80% of at least one coarse hard refractory aggregate chosen from the group consisting of mullite, bauxite, hard burned alumina and calcined flint, said coarse aggregate being of particle sizing passing a 3 mesh screen, 15% to 30% of plastic clay passing 18 mesh, from 2.5% to 7.5% finely ground nonplastic refractory material chosen from the group consisting of burned clay brick, mullite, raw kyanite, calcined kyanite, calcined bauxite and alumina, and from 2.5% to 7.5% of a refractory cement chosen from the group consisting of Portland cement and calcium aluminate cement.

10. A plastic refractory gunning composition consisting essentially of from about 15% to about 50% calcined flint clay passing 3 mesh, from 55% to 20% calcined high purity bauxite passing 6 mesh, 20% plastic bonding clay, 5% pulverized grog and 5% of a cement including from 2.5% to 5.0% calcium aluminate of molecular ratio about $2CaO \cdot 5Al_2O_3$ and from 0 to 2.5% high early strength Portland cement.

References Cited by the Examiner
UNITED STATES PATENTS 2,558,782    7/51    Ratcliffe _____ 106—64

TOBIAS E. LEVOW, *Primary Examiner.*

JOHN H. MACK, *Examiner.*